United States Patent
Connelly

(10) Patent No.: US 11,594,003 B2
(45) Date of Patent: Feb. 28, 2023

(54) HYBRID TILE-BASED AND ELEMENT-BASED VISUALIZATION OF 3D MODELS IN INTERACTIVE EDITING WORKFLOWS

(71) Applicant: Bentley Systems, Incorporated, Exton, PA (US)

(72) Inventor: Paul Connelly, Coatesville, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/892,734

(22) Filed: Aug. 22, 2022

(65) Prior Publication Data

US 2022/0392180 A1    Dec. 8, 2022

Related U.S. Application Data

(63) Continuation of application No. 17/015,981, filed on Sep. 9, 2020, now Pat. No. 11,455,779.

(51) Int. Cl.
G06T 19/20    (2011.01)

(52) U.S. Cl.
CPC .......... *G06T 19/20* (2013.01); *G06T 2200/24* (2013.01); *G06T 2219/2021* (2013.01)

(58) Field of Classification Search
None
See application file for complete search history.

(56) References Cited

U.S. PATENT DOCUMENTS 6,975,318 B2    12/2005    Junkins et al.
9,569,811 B2    2/2017    Gruber et al.
(Continued)

FOREIGN PATENT DOCUMENTS

EP    3675061 A1    7/2020

OTHER PUBLICATIONS

Burgers, W.F.PW., "Tile-Based Rendering," Master's Thesis, Technische Universiteit Eindhoven, Department of Mathematics and Computing Science, Eindhoven, Koninklijke Philips Electronics N. V., Jan. 2005, pp. 1-99.

(Continued)

*Primary Examiner* — Kee M Tung
*Assistant Examiner* — Jed-Justin Imperial
(74) *Attorney, Agent, or Firm* — Cesari and McKenna, LLP; James A. Blanchette

(57) ABSTRACT

In example embodiments, techniques are provided for visualizing a 3D model in an interactive editing workflow. A user modifies one or more elements of a model of the 3D model, by inserting one or more new elements having geometry, changing the geometry of one or more existing elements and/or deleting one or more existing elements having geometry. An updated view of the 3D model is then rendered to reflect the modification to the one or more elements in part by obtaining, for each new element or changed existing element of the model visible in the view, a polygon mesh that represents geometry of the individual element, obtaining a set of tiles that each include a polygon mesh that represent collective geometry of a set of elements intersecting the tile's volume, displaying the polygon mesh for each new element or changed existing element, and displaying the set of tiles while hiding any deleted or changed existing elements therein.

20 Claims, 7 Drawing Sheets

(56) References Cited

U.S. PATENT DOCUMENTS

| | | | |
|---|---|---|---|
| 2004/0255298 | A1 | 12/2004 | Dorrance et al. |
| 2013/0194264 | A1 | 8/2013 | Howson |
| 2013/0321400 | A1 | 12/2013 | van Os et al. |
| 2014/0267259 | A1 | 9/2014 | Frascati et al. |
| 2019/0205484 | A1* | 7/2019 | Morkos ............ G06Q 10/06313 |
| 2020/0118301 | A1 | 4/2020 | Connelly et al. |
| 2020/0118303 | A1 | 4/2020 | Connelly et al. |
| 2020/0118330 | A1 | 4/2020 | Connelly et al. |
| 2020/0210632 | A1* | 7/2020 | Sadoudi .................. G06F 30/17 |
| 2020/0250894 | A1 | 8/2020 | Mehr et al. |
| 2022/0076503 | A1 | 3/2022 | Connelly |

OTHER PUBLICATIONS

Cozzi, Patrick, ed., et al., "3D Tiles Specification 1.0," Open Geospatial Consortium, Cesium and Open Geospatial Consortium, Document No. 18-053r2, Jan. 31, 2019, pp. 1-140.

"Notification of Transmittal of the International Search Report and the Written Opinion of the International Searching Authority, or the Declaration," International Filing Date: Aug. 9, 2021, International Application No. PCT/US2021/045224, Applicant: Bentley Systems, Incorporated, dated Dec. 14, 2021, pp. 1-15.

Wong, Tsz Ho, "A Comparison of Graphics Performance of Tile Based and Traditional Rendering Architectures," Thesis, School of Computer Science and Information Technology, Royal Melbourne Institute of Technology, Melbourne, Victoria, Australia, Jan. 20, 2010, pp. 1-44.

\* cited by examiner

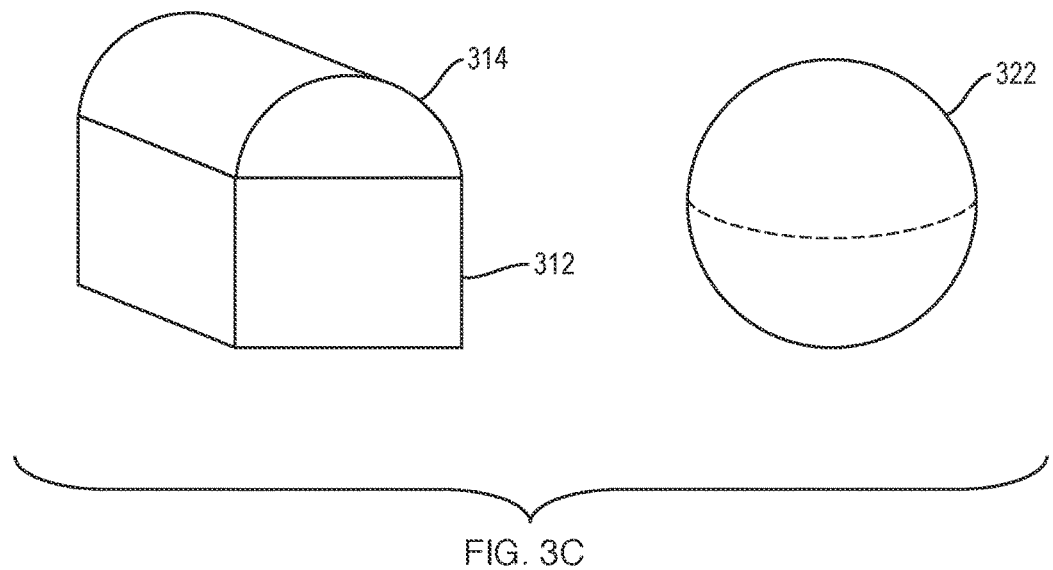

FIG. 3C

| | MODEL 1 | MODEL 2 |
|---|---|---|
| BASELINE | GEOMETRY GUID = X<br>SESSION GUID = Z<br>AXIS ALIGNED BOUNDING BOX = P<br>NEW OR CHANGED ELEMENTS = 314 | GEOMETRY GUID = Y<br>SESSION GUID = NULL<br>AXIS ALIGNED BOUNDING BOX = NULL<br>NEW OR CHANGED ELEMENTS = NULL |
| CURRENT | GEOMETRY GUID = X'<br>SESSION GUID = Z<br>AXIS ALIGNED BOUNDING BOX = P' | GEOMETRY GUID = Y<br>SESSION ID = NULL<br>AXIS ALIGNED BOUNDING BOX = Q |

FIG. 3D

|  | MODEL 1 | MODEL 2 |
|---|---|---|
| BASELINE | GEOMETRY GUID = X'<br>SESSION GUID = Z<br>AXIS ALIGNED BOUNDING BOX = P'<br>NEW OR CHANGED ELEMENTS = NULL | GEOMETRY GUID = Y<br>SESSION GUID = Z<br>AXIS ALIGNED BOUNDING BOX = Q<br>NEW OR CHANGED ELEMENTS = NULL |

HYBRID TILE-BASED AND ELEMENT-BASED VISUALIZATION OF 3D MODELS IN INTERACTIVE EDITING WORKFLOWS

RELATED APPLICATIONS

The present application is a continuation of U.S. patent application Ser. No. 17/015,981, now issued as U.S. Pat. No. 11,455,779, filed Sep. 9, 2020 by Paul Connelly for "Visualization of Massive 3D Models in Interactive Editing Workflows", the contents of which are incorporated by reference herein in their entirety.

BACKGROUND

Technical Field

The present disclosure relates generally to computer-based three-dimensional (3D) modeling, and more specifically to visualizing 3D models in the course of interactive editing workflows using a 3D modeling software application.

Background Information

Computer-based 3D modeling plays an increasingly important role in the design, construction and/or operation of objects in the real world. While 3D modeling is used in many fields, it is particularly important in the field of infrastructure, where it is commonly used in the design, construction and/or operation of buildings, plants, roads, railways, bridges, utility and communications networks, and other types of infrastructure.

A 3D model may be maintained using records of a database that include a number of elements. As used herein, the term "element" refers to a record that represents (i.e. "models", in a colloquial sense of the term) an entity in the real-world. Some 3D models may be massive in scope, such that their database may include a huge number of elements. This is particularly common in the field of infrastructure. Such scope may present a number of challenges in visualizing (i.e. rendering a view of) the 3D model given the constraints of computing hardware.

To render a view of a 3D model the geometry of each element within the visible region of the 3D model typically must be converted by a central processing unit (CPU) to a low-level representation, such as a poly mesh (e.g., a triangle mesh), consumable by a graphics processing unit (GPU). When a user interacts with the 3D model and changes the geometry of an element, the polygon mesh becomes out of date. A new polygon mesh typically must be computed to reflect the changed geometry. In an interactive editing workflow, where a user is actively manipulating the 3D model in a 3D modeling application to attempt to achieve some desired result, changes to geometry and re-computation of the polygon mesh may occur over and over again.

Two general types of approaches have commonly been employed to render a view of a 3D model: element-based approaches and tile-based approaches. However, both types of approaches have struggled to provide acceptable results in interactive editing workflows when used with massive 3D models. In a typical element-based approach, each element is drawn independently of all other elements as a discrete polygon mesh that represents the individual element's geometry. If one element's geometry changes only that element's mesh must be regenerated. However, element-based approaches scale poorly as the number of elements increase. In element-based approaches, each element typically requires a separate draw call to the GPU. Each draw call has a performance cost which negatively impacts framerate, such that as the number of draw calls increases framerate decreases. If the GPU is capable of drawing N elements while still maintaining an acceptable framerate, and M*N elements need to be drawn to complete the view of the 3D model, then element based approaches can either draw M*N elements in one frame, but reduce the framerate below the acceptable level, or draw N elements each frame over the course of M frames to maintain an acceptable framerate. In the first case, interactivity is compromised as the user is forced to wait for the view to update. In the latter case, the view of the 3D model is shown incomplete for some period of time. Elements "drop out" and then gradually "pop in", which may be highly distracting to a user. The issue may be exacerbated if view perspective or element geometry is rapidly changed, such that process must restart before there is sufficient time to catch up, as more and more of the 3D model will "drop out".

In typical tile-based approaches, the volume of the 3D model is subdivided into tiles each containing polygon meshes that represent the collective geometry of a set of elements intersecting the tile's volume. Tiles may be hierarchically organized to provide different levels of detail (LOD). For example, first level tiles may be generated and then the volume of those tiles sub-divided into smaller tiles, which represent the geometry of a subset of elements intersecting the smaller volume, but at a greater LOD. The process may be repeated recursively until a full hierarchical tree of tiles is generated. With tiles all the elements of a tile are drawn together. Separate draw calls to the GPU are only required per tile, thereby reducing the number of draw call to the GPU as opposed to element-based approaches that require a separate draw call per element. Tiles may be pre-generated, or generated upon first demand, and then cached in binary formats for subsequent reuse. This may greatly increase efficiency and performance when a 3D model remains largely static. However, issues arise in interactive editing workflows. In typical tile-based approaches, when one element's geometry is changed, all tiles intersecting that element are invalidated and must be regenerated. The polygon mesh of every tile intersecting the changed element must be updated to reflect the new state, which requires processing every element that intersects each of those tiles. This presents a challenge given the constraints of computing hardware.

In a simplistic approach, invalidated tiles may simply be discarded, and new tiles created from scratch. However, this consumes excessive hardware resources, and typically results in a significant drop in frame rate. In more complex approaches, attempts are made to repair invalidated tiles, modifying the tile itself to preserve portions of the polygon mesh corresponding to unmodified elements, or removing portions of the polygon mesh corresponding to modified elements. However, the binary formats commonly used to represent tiles are not designed for such in-place modification to tile contents. As such, tile repair may be a computationally expensive and error-prone task. It may also negatively impact tile optimization (e.g., repaired tiles typically being more poorly optimized than freshly generated tiles). In an interactive editing workflow where element geometry is rapidly changed, tile repair may fall hopelessly behind such that it cannot catch up. Further, information about what tiles require repair is often difficult to convey across application sessions.

Accordingly, there is a need for improved techniques for visualizing 3D models in the course of interactive editing workflows that may address some or all of the shortcomings of pure element-based approaches and pure tile-based approaches.

SUMMARY

In various embodiments, techniques are provided for visualizing a 3D model using a hybrid approach that is tile-based for unmodified elements and element-based for modified elements. The hybrid approach may address the scaling issues of pure element-based approaches and the tile invalidation/repair issues of pure tile-based approaches, making it better suited for visualization of massive 3D models than either individual approach. Further, the hybrid approach may establish natural session boundaries that eliminate needs to track changes across application sessions.

In one example embodiment, a technique is provided for visualizing a 3D model undergoing an interactive editing workflow One or more elements of a model of the 3D model are modified, by inserting one or more new elements having geometry, changing the geometry of one or more existing elements and/or deleting one or more existing elements having geometry. An updated view of the 3D model is rendered to reflect the modification to the one or more elements in part by obtaining, for each new element or changed existing element of the model visible in the view, a polygon mesh that represents geometry of the individual element, obtaining a set of tiles that each include a polygon mesh that represent collective geometry of a set of elements intersecting the tile's volume, displaying the polygon mesh for each new element or changed existing element, and displaying the set of tiles while hiding any deleted or changed existing elements therein. Such operations are enabled through use of a model guaranteed unique identifier (GUID) and session GUID. In response to the modifying being a first modification to the model, a session GUID is generated and a baseline state recorded that includes at least the session GUID and baseline geometry of the model, wherein the baseline GUID is set to the current geometry GUID of the model. Then a new geometry GUID of the model is generated. As part of the obtaining the set of tiles, when there is a tile in a tile cache having an assigned geometry GUID matching the baseline geometry of the model and having an assigned session GUID that is null or matching the current session GUID of the model, the tile is retrieved from the tile cache. Otherwise, the tile is generated to excluded any elements that have been modified since the baseline state was recorded, and the tile assigned the baseline GUID of the model and the current session GUID of the model. Periodically or in response to a triggering condition, the editing session is terminated and the baseline state of a model reset, in part, by updating the baseline geometry GUID to match the current geometry GUID of the model.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIG. 3C is a diagram illustrating example modifications to the example 3D model;

FIG. 3D is a table illustrating example baseline states and current states for the example 3D model;

DETAILED DESCRIPTION

Figure 1:
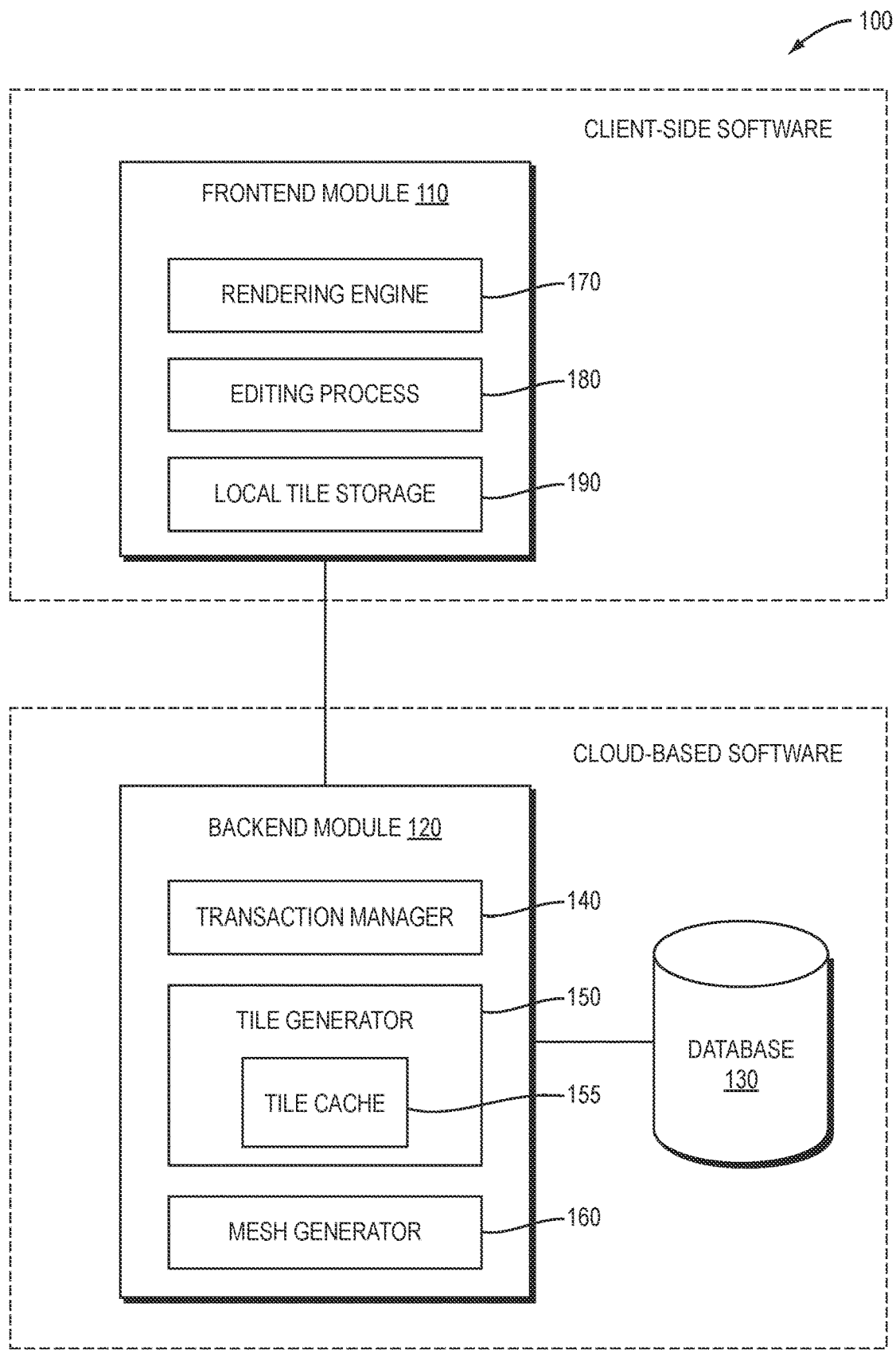
FIG. 1 is a high-level block diagram of an example software application for visualizing a 3D model.

FIG. 1 is a high-level block diagram of an example software application 100 for visualizing a 3D model. The application 100 may be a portion of an infrastructure modeling software architecture, in which case the 3D model may be a 3D model that represents infrastructure (e.g., buildings, plants, roads, railways, bridges, utility and communications networks, etc.). Alternatively, the application 100 may be a portion of another type of software architecture and the 3D model may represent other types of objects in the real world. The application is divided into a frontend module 110 and a backend module 120. The frontend module 110 and the backend module 120 may be executed on the same computing device, or on different computing devices. In one implementation, the frontend module 110 may be part of client-side software executing on a computing device local to an end-user which communicates via a network (e.g., the Internet) with the backend module 120 that is part of cloud-based software executing on cloud-based computing devices. The frontend module 110 may request services from the backend module 120 (e.g., over the Internet) and receive asynchronies responses. The frontend module 110 may also receive notifications (e.g., over the Internet) from the backend module 120 in response to events that occur during, or as a result of, the backend module's performance of services.

The backend module 120 may access a 3D model maintained as a database (e.g., an iModel® database) 130. Multiple revisions of the database (e.g., iModel® database) may be extant simultaneously, the revisions synchronized at various times. The database may include a large number of elements, at least some of which may be geometric elements that represent (i.e. "model", in a colloquial sense of the term) real world entities that intrinsically have geometry (i.e. physical shape). Each element typically has an element identifier (ID) and a number of properties. For a geometric element, such properties include geometric properties that describes the element's shape and non-geometric properties that describe other aspects of the element such as its spatial location, extent, etc. Each element typically also belongs to a category which describes aspects common to multiple elements. For a geometric element, the category may describe other aspects of appearance (e.g., material, line style, etc.) common to multiple elements. While it should be remembered that the database (e.g., iModel® database) 130 may include both geometric elements and non-geometric elements, the techniques herein primarily involve geometric elements. As such, when in appropriate context, a reference to an "element" should be interpreted as a reference to a "geometric element" despite the term "geometric" not being explicitly repeated.

The elements of the database (e.g., an iModel® database) 130 are organized into containers, referred to as "models". As used herein, the term "model" refers to a container for a set of elements where the set of elements collectively represent (i.e. "model", in a colloquial sense of the term) an entity in the real-world. Typically, each every element is contained in one and only one model. Each model is identified by a model ID. A model may be a geometric model that includes geometric elements. Each geometric model is assigned a persistent geometry Globally Unique Identifier (GUID) that uniquely identifies its geometric contents. In one implementation, the GUID may be a 128-bit Version 4 identifier according to ITU-T Rec. X.667|ISO/IEC 9834-8. When comparing two revisions of the database (e.g., iModel® database), a model's geometry GUID will defer between revisions if and only if some difference exists between the geometric properties of the elements contained within the model. While it should be remembered that the database (e.g., iModel® database) 130 may include both geometric models and non-geometric models, the techniques herein primarily involve geometric models. As such, when in appropriate context, a reference to a "model" should be interpreted as a reference to a "geometric model" despite the term "geometric" not being explicitly repeated.

The backend module 120 includes a transaction manager 140 that makes changes to the database (e.g., iModel® database) 130 on behalf of the frontend module 110. Among other things, these changes may include geometric modification to elements (i.e., inserting new elements that have geometry, changing the geometry of existing elements, and/or deleting existing elements that have geometry) and undoing or redoing recent transactions. In some implementations, the transaction manager may perform these operations by generating changesets that are applied to the database.

The backend module 120 further includes a tile generator 150 that satisfies requests for tiles from the frontend module 110. The tile generator 150 pre-generates, or generates upon first demand, tiles that each contain a polygon mesh (e.g., a triangle mesh) that represents the geometry of elements intersecting the tile's volume. Such tiles are hierarchically organized (e.g., in a tree) to provide different LOD, with tiles on various levels sub-divided into smaller tiles on lower levels, which represent the geometry of the subset of elements intersecting the smaller volume, but at a greater LOD. Each generated tile is assigned the geometry GUID of the model whose elements are included in the tile, as of the time the tile was generated. Each generated tile is also assigned a session GUID that identifies an interactive editing session during which the tile was last modified or is null. Like the geometry GUID, the session GUID may be a 128-bit Version 4 identifier according to ITU-T Rec. X.667|ISO/IEC 9834-8. The tile generator 150 includes a tile cache 155 which stores generated tiles for subsequent reuse, enabling the tile generator 150 to more rapidly satisfy requests for tiles from the frontend module 110. Each cached tile is stored in association with its assigned geometry GUID and session GUID. As explained in more detail below, the assigned geometry GUID and session GUID of a tile in the tile cache may be compared to that of the revision being viewed to determine whether the cached tile accurately reflects the geometry present in that revision.

The backend module 120 also includes a mesh generator 160 that satisfies requests for polygon meshes representing individual element from the frontend module 110. An element polygon meshes for be generated upon demand. As explained in more detail below, the mesh generator may be requested to generate polygon meshes of new or changed existing elements since a tile was generated.

The frontend module 110 includes a rendering engine 170 that renders a view of the 3D model by requesting tiles from the tile generator 150 and its tile cache 155 and polygon meshes of new or changed existing elements from the mesh generator 160, to reflect the geometry present in the revision being viewed. The mechanisms of such requests are described in more detail below. The rendering engine 170 is further responsible for displaying the supplied tile polygon meshes and element polygon meshes in a user interface of the application 100 on a display screen.

The frontend module 110 further includes an editing process 180 that provides controls in the user interface for interactively editing the 3D model. Such interactive editing may involve geometric modification to elements, including inserting new elements that have geometry, changing geometric properties of existing elements, and/or deleting elements that have geometry, thereby creating a new revision.

The frontend module 110 may also include local tile storage 190 which maintains local copies of tiles previously provided by the tile generator 150 (i.e. a local copy of a portion of the tile cache 155). In an implementation where the backend module 120 is part of cloud-based software executing on cloud-based computing devices, the local tile storage 190 may reduce network traffic. In the discussion below, when reference is made to retrieving a tile from the tile cache 155 it should be understood that if a local tile storage 190 is utilized, such retrieval may actually be from the local copy.

Figure 2:
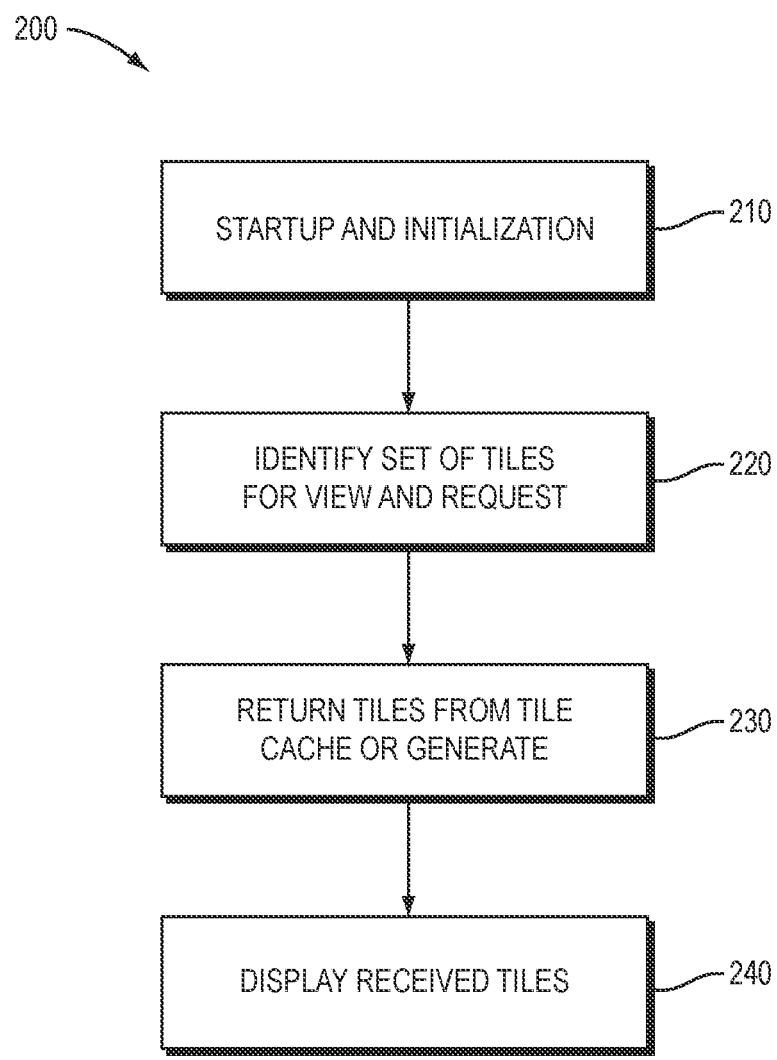
FIG. 2 is a flow diagram of an example sequence of steps for visualizing a 3D model under read-only conditions.

FIG. 2 is a flow diagram of an example sequence of steps 200 for visualizing a 3D model under read-only conditions. Such steps provide a starting point from which the use of the hybrid approach in an interactive editing workflow can be better understood. At step 210, startup and initialization operations are performed. The application 100 starts the frontend module 110 and the backend module 120. A revision of the database (e.g., iModel® database) is opened and a view of the 3D model displaying a number of models thereof is defined within the user interface of the application 100. For each of these models, the frontend module 110 requests the model's current geometry GUID.

Figure 3A:
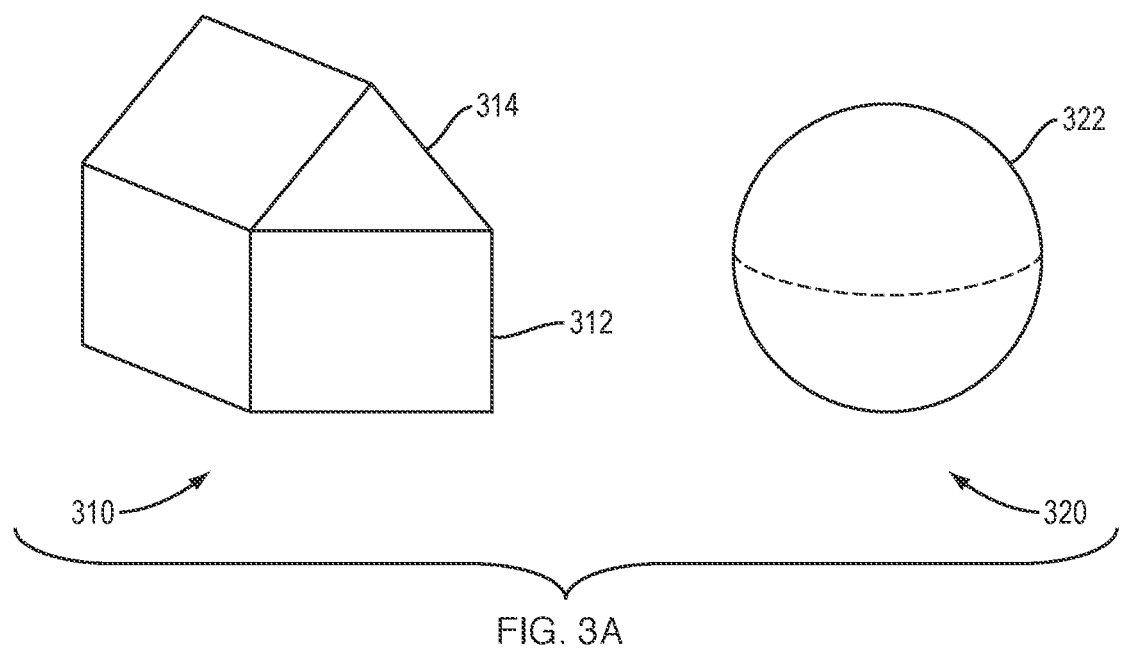
FIG. 3A is a diagram illustrating a view of an example 3D model.

FIG. 3A is a diagram illustrating a view of an example 3D model. It should be understood that the example 3D model 300 is extremely simplistic for ease of illustration, and that typically 3D models are generally far more complex. The example 3D model includes a first model 310 containing first and second elements 312, 314 and a second model 320, including a single element 322.

At step 220, for each model, the rendering engine 170 of the frontend module 110 identifies a set of tiles required to render the view (e.g., at the LOD required) and requests the set of tiles from the tile generator 150 of the backend module 120, supplying the model's current geometry GUID with each request.

At step 230, for each requested tile, the tile generator 150 of the backend module 120 checks if a matching tile is available in its tile cache 155. If there is a cached tile having an assigned geometry ID that matched the model's current geometry GUID, the cached tile is simply returned to the rendering engine 170 of the frontend module 110. If there is no cached tile, or if the cached tile has an assigned geometry ID that does not match the supplied geometry GUID, the tile generator 150 generates a new tile that is returned to the rendering engine 170 of the frontend module 110, and written to the tile cache 155. The new tile is assigned the model's current geometry GUID and a null session GUID.

Figure 3B:
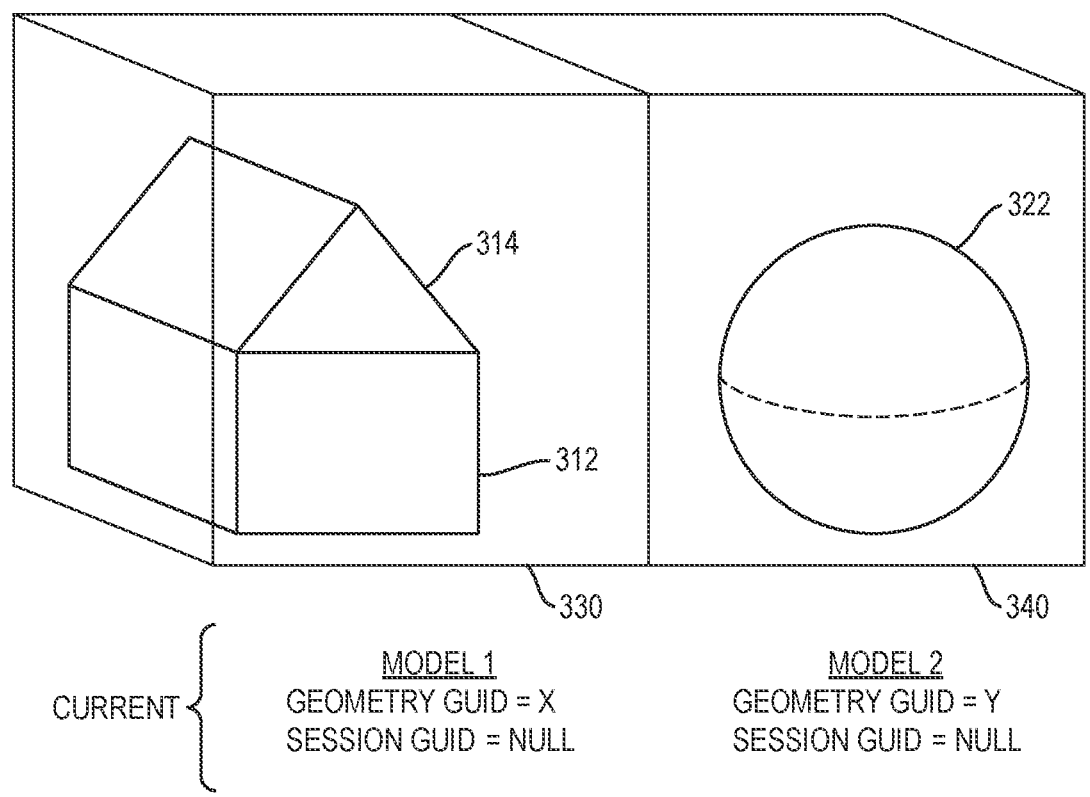
FIG. 3B is a diagram illustrating example tiles for rendering the view of the example 3D model.
Figure 3E:
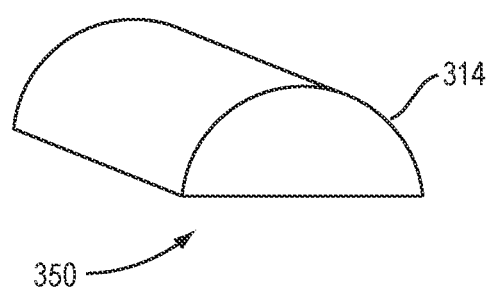
FIG. 3E is an example individual polygon mesh that may be returned by a mesh generator.
Figure 3F:
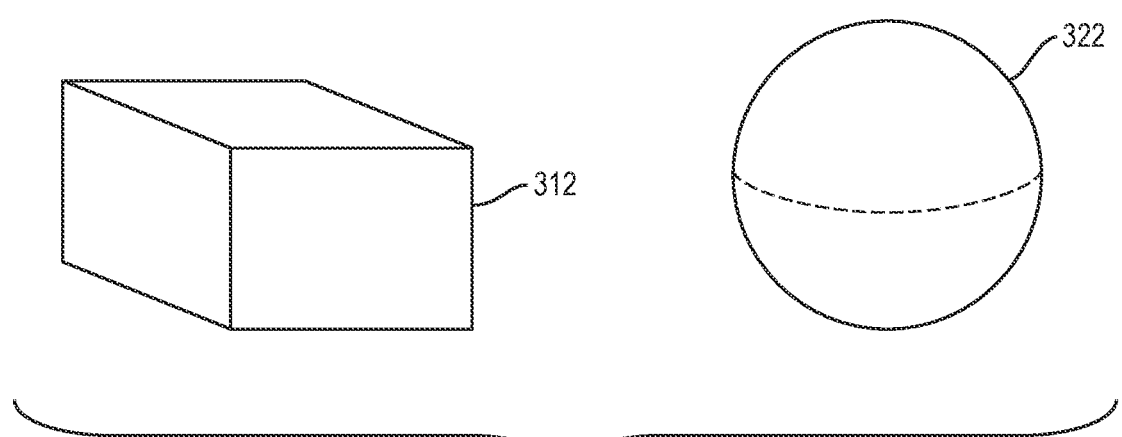
FIG. 3F is a display resulting from a first tile and a second tile with changed elements hidden.

Continuing the example of FIG. 3A, FIG. 3B is a diagram illustrating example tiles for rendering the view of the example 3D model. For ease of illustration, the set of tiles required to render the view of each model in this example comprises a single tile. However, it should be understood that in typical cases many tiles may be required. A first tile 330 includes the polygon mesh for elements 312, 314 of the first model 310. A second tile 340 includes the polygon mesh for element 322 of the second model 320. The first tile and the second tile are each assigned the respective model's current geometry GUID, represented here simply as "X" and "Y", and a null session GUID.

At step 240, the rendering engine 170 of the frontend module 110 displays each received tile in the user interface of the application 100 on the display screen, to show the view of the 3D model according to its current revision. The steps 200 may be repeated each time criteria affecting the of tiles required to render the view changes (e.g., the user changes viewing perspective, changes the set of displayed models, etc.).

Figure 4:
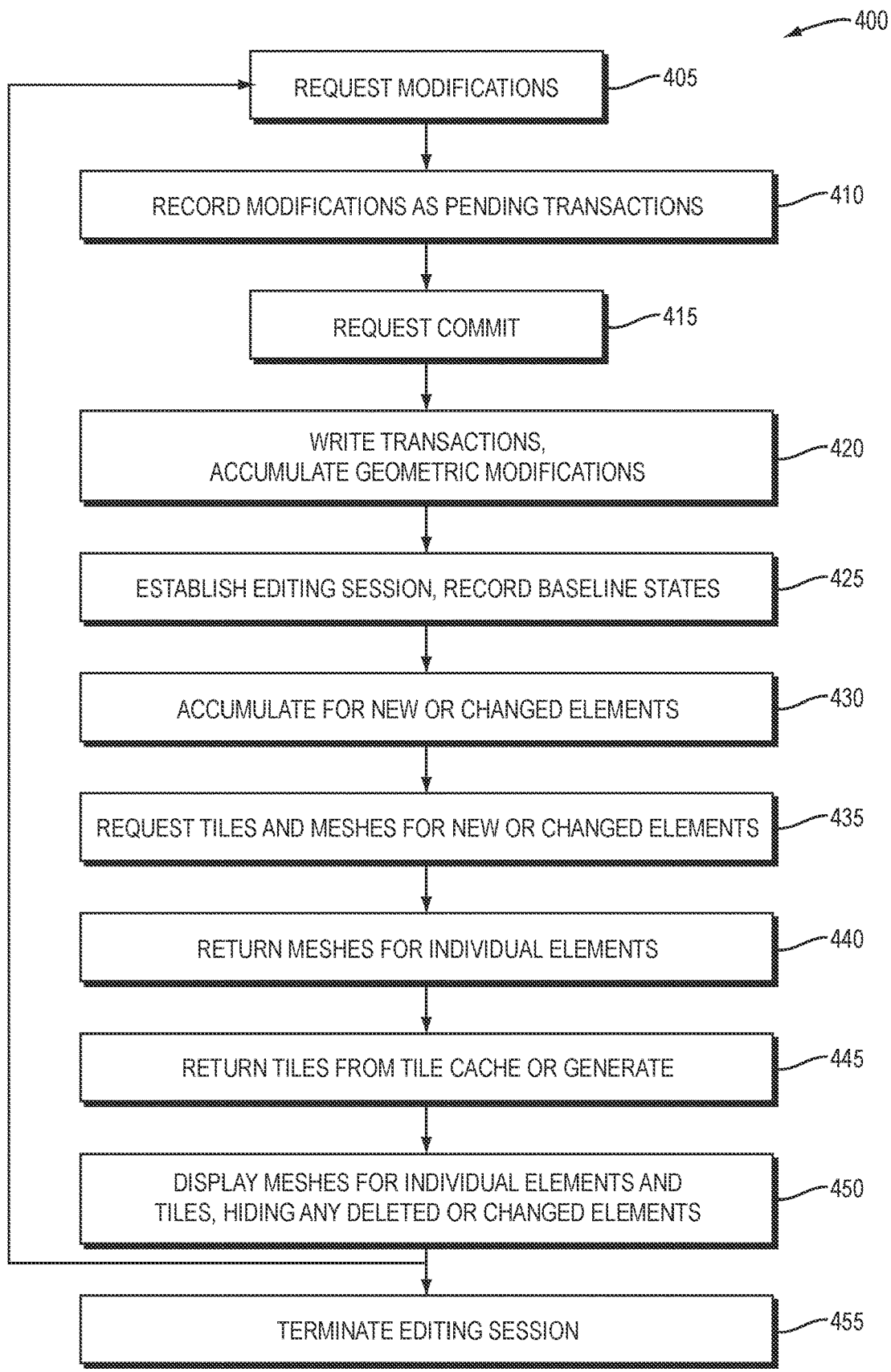
FIG. 4 is a flow diagram of an example sequence of steps for visualizing a 3D model during an interactive editing workflow.

The hybrid approach becomes active when a user requests a modification to elements of a model (e.g., inserting new elements having geometry, changing the geometry of existing elements, and/or deleting existing elements having geometry) as part of an interactive editing workflow. FIG. 4 is a flow diagram of an example sequence of steps 400 for visualizing a 3D model during an interactive editing workflow. At step 405, in response to user input in the user interface, the editing process 180 of the frontend module 110 requests the backend module 120 apply some modifications to one or more elements of models changing geometry.

Continuing the example of FIGS. 3A-3B, FIG. 3C is a diagram illustrating example modifications to the example 3D model. The second element 314 of the first model 310 is modified from being shaped as a triangular prism to being shaped as a semi-cylindrical prism. The first element 312 of the first model 310 and the element 322 of the second model 320 are not modified.

At step 410, the transaction manager 140 of the backend module 120 may record the modification as changesets that are maintained as pending transactions.

At step 415, in response to user input in the user interface, the editing process 180 of the frontend module 110 requests the backend module 120 commit the pending transactions to the database (e.g., iModel® database) 130.

At step 420, the transaction manager 140 of the backend module 120 writes the transaction to the database (e.g., iModel® database) 130. The database 130 may invoke callbacks associated with specific database tables storing geometry data. The callbacks detect and accumulate geometric modifications on a per-model basis, including insertion of new elements that have geometry, changes to geometry of existing elements, and deletions of existing elements that have geometry.

At step 425, after the callbacks have been invoked, the transaction manage 140 performs a series of operations to establish an editing sessions and record baseline states. For each model having modified elements, if this is the first modification, an editing session is established for the model and a session GUID generated. Then a baseline state is recorded that includes the session GUID, the model's current geometry GUID, and its current axis-aligned bounding box. The element ID of each new or changed element of the model is also stored in the baseline state. After the baseline is recorded, the transaction manager 140 generates a new geometry GUID for each model having modified elements and stores this new geometry GUID in the database (e.g., iModel® database) 130. Further, for each model having modified elements in which these operations are performed, the transaction manage 140 sends a notification to the frontend module 110 including the model ID, the model's new axis-aligned bounding box and for each modified element of the model, its element ID, and (in the case of a new or changed existing element) its new axis-aligned bounding box.

Continuing the example of FIGS. 3A-3C, FIG. 3D is a table illustrating example baseline states and current states for the example 3D model. The baseline state for the first model 310 may include a session ID represented here as simply as "Z" as it has modified elements, the model's current GUID of "X", the axis-aligned bounding box of the model represented here as simply as "P" and a list of new or changed existing elements including the element ID of the second element 314, represented here simply with is reference numeral 314. The baseline state for the second model 310 may still include the session ID of null as it has no modified elements and the model's current GUID of "Y". There may be no list of changed existing elements since the second model has not been modified. The current geometry GUID of the first model 310 is updated, here represented simply as "X'" and the current axis-aligned bounding box of the model is updated, here represented simply as "P'" and written to the database, while the current geometry GUID and of the second model 320 is maintained as "Y". The current axis-aligned bounding box of the second model 320 may be represented simply as "Q".

At step 430, the front end module 110 accumulates from the notifications sent from the transaction manage 140 of the backend module 120, on a per-model basis, the element IDs and axis-aligned bounding boxes of any new or changes existing elements, and the model's new axis-aligned bounding box.

Then visualization of the 3D model is updated. At step 435, for each model, the rendering engine 170 of the frontend module 110 identifies the set of tiles required to render the view (e.g., at the LOD required by the view) and requests the set of tiles from the tile generator 150 of the backend module 120, supplying the model's current geometry GUID with each request. The rendering engine 170 also, for each model, tests the axis-aligned bounding box of new or changed existing elements (e.g., against a view frustrum) to determine if they should be visible, and if so at what LOD. For each visible new or changed existing element, provided a polygon mesh at the required LOD is not already available, at the frontend module 110, the rendering engine 170 requests a polygon mesh for the element from the mesh generator 160 of the backend module 120.

Continuing the example of FIGS. 3A-3D, the frontend module 110 may request the first tile 330 and the second tile 340, along with a polygon mesh for the second element 314 which has been changed.

At step 440, for each requested element, the mesh generator 160 of the backend module 120 processes the geometry of each requested elements and returns a polygon mesh at the appropriate LOD representing the individual element to the rendering engine 170 of the frontend module 110. Requests for individual elements may be prioritized before requests for tiles to ensure user's modifications are reflected in the view of the 3D model as soon as possible.

Continuing the example of FIGS. 3A-3D, FIG. 3E is an example individual polygon mesh 350 that may be return by the mesh generator 160. Here, the individual polygon mesh 350 is for the changed second element 314 of the first model 310.

At step 445, for each requested tile, the tile generator 150 of the backend module 120 checks if a matching tile is available in its tile cache 155. If there is a cached tile having a geometry GUID matching the model's baseline geometry ID and having either a Null session GUID or a session GUID matching the model's current session GUID, it is retrieved from the tile cache 155 and returned to the rendering engine 170 of the frontend module 110. Any other tiles are generated to exclude geometry that has changed since the baseline state was established. Specifically, for each tile the tile generator 150 collects the element ID of all elements intersecting the tile's volume, but excluding any elements that have been modified since the baseline state was established creating an unmodified element list. The tile generator 150 processes the geometry of each element of the unmodified element list to generate a new tile. The new tile is returned to the rendering engine 170 of the frontend module 110, and written to the tile cache 155. The new tile is assigned the model's baseline geometry GUID and the current session GUID.

Continuing the example of FIGS. 3A-3E, the frontend module 110 has requested the first tile 330 and the second tile 340. The tiles are stored in the tile cache 155 with a geometry GUIDs of "X" and "Y", respectively, which match the baseline geometry GUIDs. Further, the first tile 330 has a session GUID of "Z" that matches the model's current session GUID, and the second tile 330 has a null session GUID, so each tile is simply retrieved from the tile cache 155 and returned to the rendering engine 170 of the frontend module 110.

At step 450, the rendering engine 170 of the frontend module 110 displays the received polygon mesh of each individual element in the user interface of the application 100 on the display screen. The rendering engine 170 of the frontend module 110 further displays each received tile in the user interface of the application 100 on the display screen, hiding any deleted or changed elements therein. The combination creates the view of the 3D model.

Figures 3G, 3H:
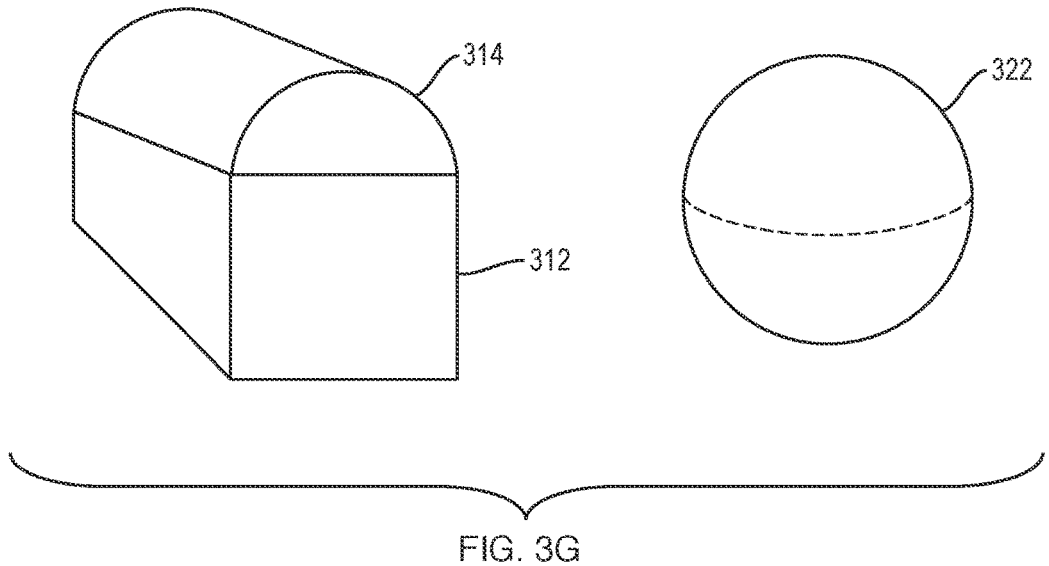
FIG. 3G is a display of the example 3D model resulting from the combination of the individual polygon mesh from FIG. 3E and the display of the first tile and second tile with changed element hidden from FIG. 3F.
FIG. 3H is a table illustrating example reset baseline states and current states for the example 3D model, assuming a reset was triggered immediately after the display of FIG. 3G.

Continuing the example of FIGS. 3A-3E, FIG. 3F is a display 360 resulting from the first tile 330 and the second tile 340 with changed element 314 hidden. FIG. 3G is a display 370 of the example 3D model resulting from the combination of the individual polygon mesh 355 from FIG. 3E and the display 360 of the first tile 330 and second tile 340 with the changed element 314 hidden from FIG. 3F.

Step 405-450 may be repeated as modifications to are made to elements as part of the interactive editing workflow. Periodically or in response to a triggering condition, the frontend module 110 may request the backend module 120 to reset the baseline state of the models. When this occurs, step 455 is activated and the backend module 120 terminates the each model's editing session and updates its baseline geometry GUID to match the current model geometry GUID and the baseline axis-aligned bounding box to match the current axis-aligned bounding box. As a result, subsequent requests will return a tile with a polygon mesh that reflects the model's current geometry.

Continuing the example of FIGS. 3A-G, FIG. 3H is a table illustrating example reset baseline states and current states for example 3D model, assuming a reset was triggered immediately after the display 370 of FIG. 3G. The baseline state for the first model 310 may be reset to update the baseline geometry GUID to "X'" and the axis-aligned bounding box to "P'" to coincide with the current state.

At any time the frontend model 110 may request the backend module 120 undo (i.e. roll back) any number of previously-committed transactions to a model. If these transactions include modifications to geometry, the geometric properties of elements of the model are reverted to their previous states, and the model's geometry GUID reverted to its previous value. However, the model's baseline geometry GUID and session GUID remain unchanged. As a result, the "undone" elements will continue to be treated as modified and omitted from subsequently-generated tiles.

The above described hybrid approach that is tile-based for unmodified elements and element-based for modified elements has a number of advantaged over pure element-based approaches and pure tiled-based approaches. In contrast to pure element-based approaches, the hybrid approach may better scale for handling massive 3D models. If N of M total elements in the model have been modified, then only N draw calls to a GPU, in addition to the number of tiles, are required to complete the view of the 3D model, verses N*M for a pure element-based approach. In massive 3D models N/M tends to be small, so scalability issues are minimized. In contrast to pure tiled-based approaches, issues of tile invalidation and repair are avoided. During an interactive editing workflow, previously generated tiles can continue to be used to produce the view of the 3D model, obviating the need for inefficient tile regeneration or complicated and error-prone tile repair. Further, the hybrid approach may establish natural session boundaries that eliminate the need to track changes across application sessions. A model's editing session naturally terminates when the application 100 exists or at the application's explicit request. When the session ends, any model with changed geometry will produce new, optimal tiles representing the current state.

It should be understood that a wide variety of adaptations and modifications may be made to the techniques. Further, in general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for providing a visualization of a three-dimensional (3D) model wherein a volume of the 3D model is subdivided into a plurality of tiles, comprising:
  receiving, by a backend module executing on one or more computing devices, one or more geometric modifications to the 3D model, the geometric modifications to insert one or more new elements having geometry, change the geometry of one or more existing elements and/or delete one or more existing elements having geometry;
  recording a baseline state for the 3D model before writing the geometric modifications;
  receiving, by the backend module, a request for information required to render a view of the 3D model with the geometric modifications;
  for each new element or changed existing element of the 3D model visible in the view, providing, by the backend module, a polygon mesh that represents geometry of the individual element; and
  for each tile that includes elements visible in the view, providing, by the backend module, a tile that represents collective geometry of elements intersecting the tile's volume but excluding any elements that have been modified since the baseline state,
  wherein each provided polygon mesh is combinable with a respective provided tile to create the view of the 3D model with the geometric modifications.

2. The method of claim 1, further comprising:
  wherein the request for information includes identification of a set of tiles that include elements visible in the view and each new element or changed existing element visible in the view.

3. The method of claim 1, wherein each tile is associated with an axis aligned bounding box and each new element or changed existing element is associated with an axis aligned bounding box, and the tile includes elements visible in the view when the tile's axis aligned bounding box intersects a view frustrum of the view and the new element or changed existing element is visible in the view when the element's axis aligned bounding box intersects the view frustrum of the view.

4. The method of claim 1, wherein the recording the baseline state for the 3D model further comprises:
  recording a baseline geometry guaranteed unique identifier (GUID) and a baseline session GUID.

5. The method of claim 4, wherein the request for information is associated with a current session GUID, and the providing the tile further comprises:
  determining the tile is in a tile cache and has an assigned geometry GUID matching the baseline geometry GUID and has an assigned session GUID that is null or matches the current session GUID; and
  retrieving the tile from the tile cache.

6. The method of claim 4, wherein the request for information is associated with a current session GUID, and the providing the tile further comprises:
  generating the tile to represent the collective geometry of elements intersecting the tile's volume but excluding any elements that have been modified since the baseline state, and assigning the tile the baseline GUID and the current session GUID.

7. The method of claim 6, wherein the generating the tile further comprises:
  collecting an element identifier (ID) of each element intersecting the tile's volume but excluding any elements that have been modified since the baseline state was recorded to create an unmodified element list; and
  processing geometry of each element of the unmodified element list.

8. The method of claim 4, further comprising:
  resetting the baseline state for the 3D model by updating the baseline geometry GUID to match a current geometry GUID of the 3D model.

9. The method of claim 1, wherein the 3D model represents infrastructure and the backend module is part of an infrastructure modeling software architecture.

10. A method for providing a visualization of a three-dimensional (3D) model wherein a volume of the 3D model is subdivided into a plurality of tiles, comprising:
  recording, by a backend module executing on one or more computing devices, a baseline state for the 3D model before writing the geometric modifications;
  receiving, by the backend module, a request for information required to render a view of the 3D model with the geometric modifications;
  for each new element or changed existing element of the 3D model visible in the view, providing, by the backend module, a polygon mesh that represents geometry of the individual element;
  for each tile that includes elements visible in the view, providing, by the backend module, a tile that represents collective geometry of elements intersecting the tile's volume but excluding any elements that have been modified since the baseline state, wherein each provided polygon mesh is combinable with a respective provided tile to create the view of the 3D model with the geometric modifications; and
  subsequent to the providing the polygon mesh and the providing the tile, resetting the baseline state for the 3D model to include the geometric modifications.

11. The method of claim 10, further comprising:
  wherein the request for information includes identification of a set of tiles that include elements visible in the view and each new element or changed existing element visible in the view.

12. The method of claim 10, wherein each tile is associated with an axis aligned bounding box and each new element or changed existing element is associated with an axis aligned bounding box, and the tile includes elements visible in the view when the tile's axis aligned bounding box intersects a view frustrum of the view and the new element or changed existing element is visible in the view when the element's axis aligned bounding box intersects the view frustrum of the view.

13. A non-transitory electronic device readable medium having instructions stored thereon, the instructions when executed by one or more processors of one or more computing devices are operable to:
  receive one or more geometric modifications to a three-dimensional (3D) model that is subdivided into a plurality of tiles, the geometric modifications to insert one or more new elements having geometry, changes the geometry of one or more existing elements and/or delete one or more existing elements having geometry;
  record a baseline state for the 3D model before writing the geometric modifications;
  provide information required to render a view of the 3D model with the geometric modifications by
    for each new element or changed existing element of the 3D model visible in the view, returning a polygon mesh that represents geometry of the individual element, and for each tile that includes elements visible in the view, returning a tile that represents collective geometry of elements intersecting the tile but excluding any elements that have been modified since the baseline state, wherein each returned polygon mesh is combinable with a respective returned tile to create the view of the 3D model with the geometric modifications.

14. The non-transitory electronic device readable medium of claim 13, further comprising instructions that when executed are operable to:

receive a request for information required to render the view of the 3D model with the geometric modifications, wherein the request for information includes identification of a set of tiles that include elements visible in the view and each new element or changed existing element visible in the view.

15. The non-transitory electronic device readable medium of claim 13, wherein each tile is associated with an axis aligned bounding box and each new element or changed existing element is associated with an axis aligned bounding box, and the tile includes elements visible in the view when the tile's axis aligned bounding box intersects a view frustrum of the current view and the new element or changed existing element is visible in the view when the element's axis aligned bounding box intersects the view frustrum of the current view.

16. The non-transitory electronic device readable medium of claim 13, further comprising instructions that when executed are operable to:

record a baseline geometry guaranteed unique identifier (GUID) and a baseline session GUID.

17. The non-transitory electronic device readable medium of claim 16, further comprising instructions that when executed are operable to:

determine the tile is in a tile cache and has an assigned geometry GUID matching the baseline geometry GUID and has an assigned session GUID that is null or matches the current session GUID; and retrieve the tile from the tile cache.

18. The non-transitory electronic device readable medium of claim 16, further comprising instructions that when executed are operable to:

generate the tile to represent the collective geometry of elements intersecting the tile but excluding any elements that have been modified since the baseline state, and assigning the tile the baseline GUID and a current session GUID.

19. The non-transitory electronic device readable medium of claim 18, further comprising instructions that when executed are operable to:

collect an element identifier (ID) of each element intersecting the tile but excluding any elements that have been modified since the baseline state was recorded to create an unmodified element list; and process geometry of each element of the unmodified element list.

20. The non-transitory electronic device readable medium of claim 16, further comprising instructions that when executed are operable to:

reset the baseline state for the 3D model by updating the baseline geometry GUID to match a current geometry GUID of the 3D model.

* * * * *